United States Patent [19]

Rogers et al.

[11] Patent Number: 4,523,383
[45] Date of Patent: Jun. 18, 1985

[54] POSITION SENSING APPARATUS

[75] Inventors: Michael J. Rogers, San Jose, Calif.; David R. McMurtry, Wotton-under-Edge, England

[73] Assignee: Renishaw Electrical Limited, Wotton-under-Edge, England

[21] Appl. No.: 517,627

[22] Filed: Jul. 27, 1983

[30] Foreign Application Priority Data

Jul. 28, 1982 [GB] United Kingdom ............... 8221820

[51] Int. Cl.³ ................................................ G01B 7/28
[52] U.S. Cl. .................................. 33/558; 33/169 R; 33/172 E
[58] Field of Search ............ 33/169 R, 172 E, 174 L, 33/149 J, 174 R

[56] References Cited

U.S. PATENT DOCUMENTS

| 2,932,482 | 4/1960 | Dickie | 248/358 |
| 3,845,561 | 11/1974 | Elsdoerfer | 33/169 R |
| 3,888,012 | 6/1975 | Droz | 33/174 L |
| 3,990,153 | 11/1976 | Calame | 33/174 L |
| 4,078,314 | 3/1978 | McMurtry | 33/174 L |
| 4,084,323 | 4/1978 | McMurtry | 210/127 |
| 4,130,941 | 12/1978 | Amsbury | 33/172 E |
| 4,279,079 | 7/1981 | Gamberini et al. | 33/174 L |
| 4,441,257 | 4/1984 | Golinelli et al. | 33/172 E |

FOREIGN PATENT DOCUMENTS 1912605 10/1970 Fed. Rep. of Germany .
1551218 8/1979 United Kingdom .

Primary Examiner—Willis Little
Attorney, Agent, or Firm—Spencer & Frank

[57] ABSTRACT

A probe for sensing the position of a workpiece comprises a housing adapted to be secured to a coordinate measuring machine. A stylus projecting from the housing is engageable with the workpiece for sensing the position thereof. The stylus is secured to a moveable member supported within the housing by three bellows having mutually perpendicular axes and each secured to the moveable member and the housing in position therebetween. Since a bellows is inherently stiff in torsion about its axis but is flexible axially and transversely, the bellows cooperate to constrain the stylus for parallel motion. More particularly, any one first bellows can expand or contract to accommodate movement of the stylus in the direction of the axis of that the first bellows, a second one of the bellows prevents tilting of the stylus by virtue of its torsional stiffness. At the same time both the second and third bellows flex transversely to accommodate the expansion or contraction of the first bellows. The stylus is biased into a rest position determined by the condition of the bellows when the stylus is free. Displacement of the stylus (152) is determinable by inductive proximity sensors.

8 Claims, 4 Drawing Figures

POSITION SENSING APPARATUS

BACKGROUND OF THE INVENTION

This invention relates to position sensing apparatus. British Patent No. 1,551,218 describes apparatus for sensing the position of an object, comprising a moveable member connected to a fixed member by three support units adapted to constrain the members for relative displacement parallel to the three directions respectively of the orthogonal coordinate system, the units being connected in series in a compact box-like arrangement, the moveable member including a stylus for engaging the object, and the apparatus including means for sensing a said relative displacement.

The known apparatus has the advantage of compact construction, but the serial connection of the units has the disadvantage of placing nonuniform loads on the respective units. Also, the units of the known apparatus each comprise two parts constrained for relative parallel displacement by a pair of parallel leaf springs connected to the parts in position therebetween. Such a connection can result in slight tilting of the moveable member when the latter is being displaced. Further, the arrangement of the units in said box-like construction can result in a structure which is relatively complex and can be difficult to produce. It is an object of this invention to overcome at least one of these disadvantages.

SUMMARY OF THE INVENTION

The invention claimed herein overcomes at least one of the above disadvantages by providing apparatus for sensing the position of an object, comprising a fixed member, a moveable member including a stylus, three support units connected to the fixed and moveable members in position therebetween and aligned with respective directions any one of which is at an angle to the other two, the support units cooperating to constrain the moveable member for three dimensional parallel movement relative to the fixed member, and sensing means for sensing the movement of the moveable members; characterized in that the support units are each connected to the fixed and moveable members in positions therebetween to constitute parallel connections between the fixed and the moveable member and each said unit comprises rigid means constraining the moveable member against rotation about the axis pertaining to the unit and flexible means permitting said relative movement in said directions.

As stated, the units are each arranged to constitute parallel connections between said members, i.e. each unit is connected to the members in parallel with both the other units. Thereby, compared to the known construction, the load exerted on the units in operation is more likely to be uniform, tilting of the moveable member is less likely and/or the possibility of simpler construction is increased.

BRIEF DESCRIPTION OF THE DRAWINGS

FIG. 3 is a sectional elevation of a probe according to a second example, a

DESCRIPTION OF THE PREFERRED EMBODIMENTS

Figures 1, 2:
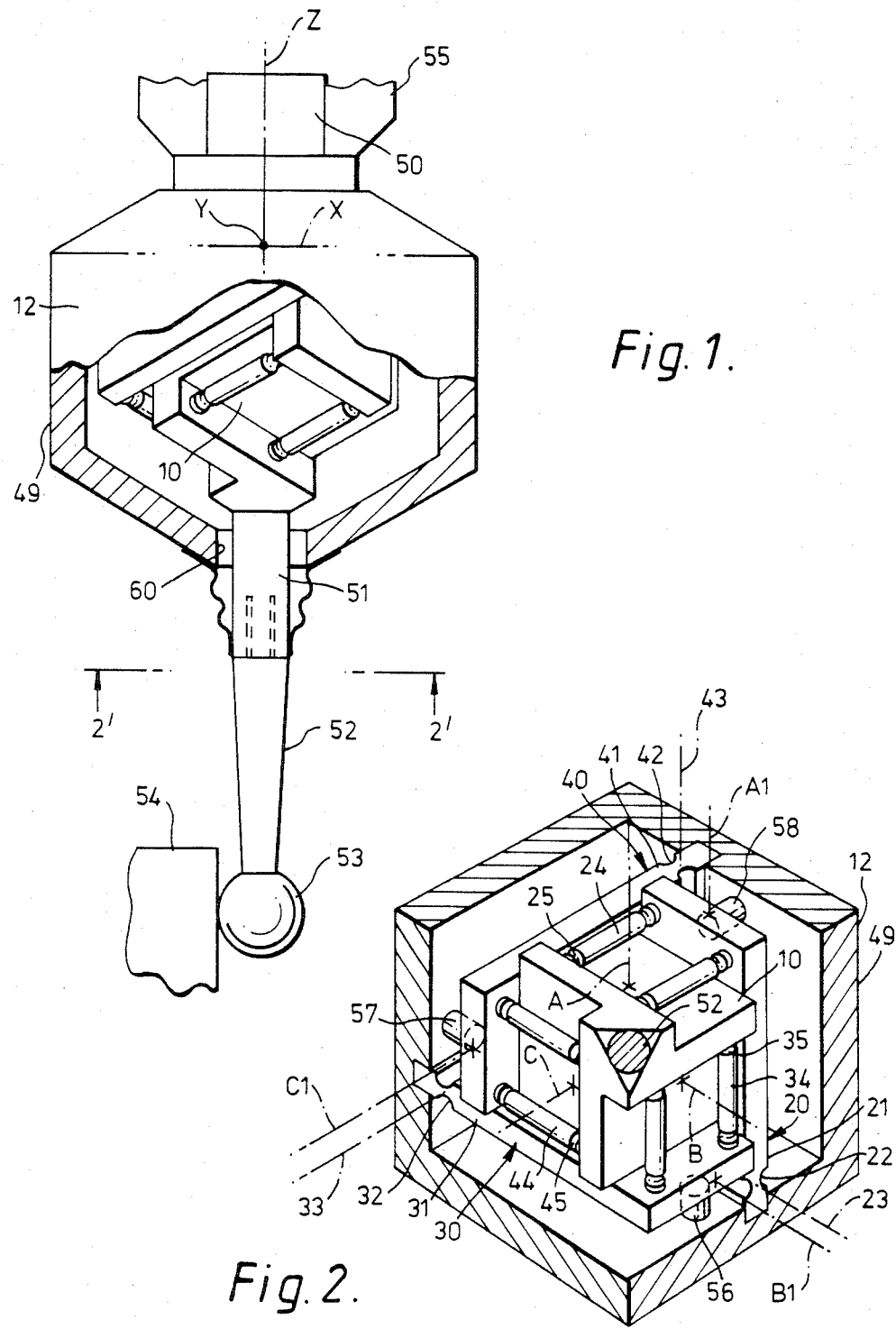
FIG. 1 is a part sectional elevation of a probe according to a first example.
FIG. 2 is a section on the line 2'—2' in FIG. 1.

Referring to FIGS. 1 and 2, the probe comprises a moveable member 10 connected to a fixed member 12 by three support units 20, 30, 40 arranged with reference to three mutually perpendicular directions A, B, C. The unit 20 comprises an arm 21 extending in the direction of an axis A1 parallel to the direction A. The arm 21 is connected at one end thereof to the member 12 by a resilient pivot 22 having a pivot axis 23 parallel to the direction B. The opposite or free end of the arm is connected to the movable member 10 by a parallel pair of links 24 extending in the direction A and being spaced apart in the direction B. Each link 24 is connected at its ends to the adjacent portion of the member 10 and of the arm 21 by a resilient pivot 25. The pivots 25 allow universal pivotal or flexural motion of the links 24 relative to the member 10 and the arm 21.

The units 30, 40 have corresponding arms 31, 41 extending in the direction of axes B1, C1 and having pivots 32, 42 on axes 33, 43. The free ends of the arms 31, 41 are connected to the member 10 by respective pairs of links 34, 44 extending in the directions A, B and having resilient pivots 35, 45. Thus the units 20, 30, 40 constitute parallel connections between the members 10, 12.

The arm 21 is dimensioned to be torsionally stiff about the axis A1 and the links 24 are of course stiff in the direction of their length. As a result the arm 21 and links 24 cooperate to constrain the member 10 against rotation relative to the member 12 about the axis A1. However the pivots 22, 25, 32, 35, 42, 45 permit parallel movement of the member 10 relative to the member 12 in the directions A, B, C.

The arms 31, 41 correspondingly constrain the member 10 against rotation about axes B1, C1 (which are parallel to the directions B, C respectively) and the pivots 22, 25, 32, 35, 42, 45 permit movement of the member 10 in the directions A, B, C. Thus the three units 20, 30, 40 cooperate to constrain the member 10 against any rotation relative to the member 12 while permitting parallel motion relative to the member 12.

The arms 21, 31, 41 and links 24, 34, 44 are made of spring steel and the pivots 22, 25, 32, 35, 42, 45 which are formed by weakened portions of the arms and the links, constitute springs which bias the member 10 into a rest position relative to the member 12. The member 10 is displaceable from the rest position in opposition to the spring force of the pivots 22, 25, 32, 35, 42, 45 and the latter force returns the member 10 to the rest position when the displacing force ceases. Said displacement is sensed by inductive transducers 56, 57, 58 arranged between the member 12 and the respective arms 21, 31, 41.

It will be seen that the member 10 is generally cube-shaped and that, in each of the units 20, 30, 40 the arm 21, 31 or 41 extends along one side of the cube while the corresponding link 24, 34 or 44 extends at right angles to the arm along another side of the cube. This provides for a compact construction of the probe.

The member 12 comprises a housing 49 surrounding the member 10 and the units 20, 30, 40, and further comprises a spigot 50 for being secured to the head 55 of a coordinate measuring machine. The member 10 comprises a stylus socket 51 extending from the housing 49 through an opening 60 thereof, and further comprises a stylus 52 releasably connected to the socket, and having a spherical end 53. It will be clear that the stylus 53 is itself in a rest position when the member 10 is at its rest position.

A measuring operation to be carried out by the machine involves moving the head 55 relative to a workpiece 54 to bring the end 53 into engagement therewith, and to sense the consequent displacement of the member 10 from the rest position by means of the transducers 56, 57, 58. The measuring operation may involve halting the head during a said displacement in a known position relative to a machine datum and determining the magnitude of the displacement, i.e. the output of the transducers 56, 57, 58, when the head is halted. Alternatively, the measuring operation may involve outputting a pulse signal when a given magnitude of displacement is reached and to identify the position of the head at the instant of the pulse signal, the latter signal also being used to halt the head to avoid damage to the probe. These aspects of measuring are well understood per se and need not be further described.

The principal directions of measurement of the machine are defined by axes X, Y, Z.

In the example shown in FIGS. 1 and 2 the directions A, B, C are defined by lines intersecting, and forming equal angles with, the axis Z which is a common axis for the spigot 50 and the stylus 52. In use the position of the probe is usually such that the axis Z is vertical. The arrangement has the advantage that the three units 20, 30, 40 are affected equally by gravity and by displacing forces transverse to the axis Z. However, inasmuch as the directions A, B, C are not parallel to the axes X, Y, Z, the output of the transducers has to be calibrated to allow for the angles of the directions A, B, C. Such calibration is only necessary if the measuring operation is such that the actual magnitude of the displacement has to be measured (as distinct from merely generating a said pulse signal).

Figure 3:
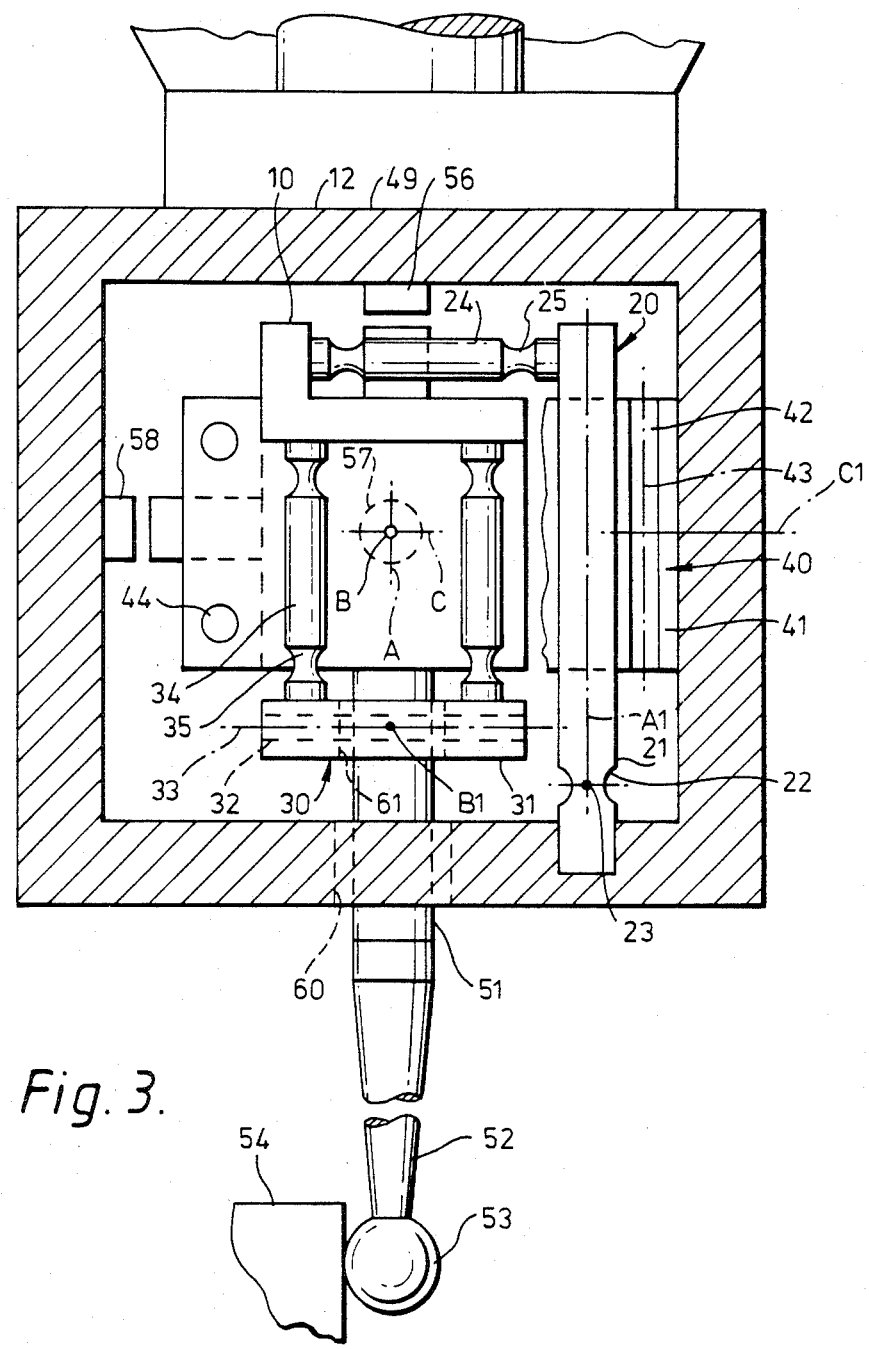

As mentioned, the probe illustrated in FIGS. 1 and 2 has units 20, 30, 40 aligned with directions A, B, C each lying at an angle to the coordinate axes X, Y, Z of the machine. Distinct from this FIG. 3 shows a probe in which the directions A, B, C are coincident with the axes X, Y, Z. Otherwise the probe of FIG. 3 is the same as the probe shown in FIGS. 1 and 2, like parts being given like reference numerals and apart from the angular relationship of the axes A, B, C and X, Y, Z, the description of the probe of FIGS. 1 and 2 applies equally to the probe shown in FIG. 3. One minor difference is that in FIG. 3 the transducers 56, 57, 58 are arranged between the member 10 and the housing 49 and as a consequence of the angular position of the units 10, 20, 30, the socket 51 is taken through a hole 61 in the arm 31.

Figure 4:
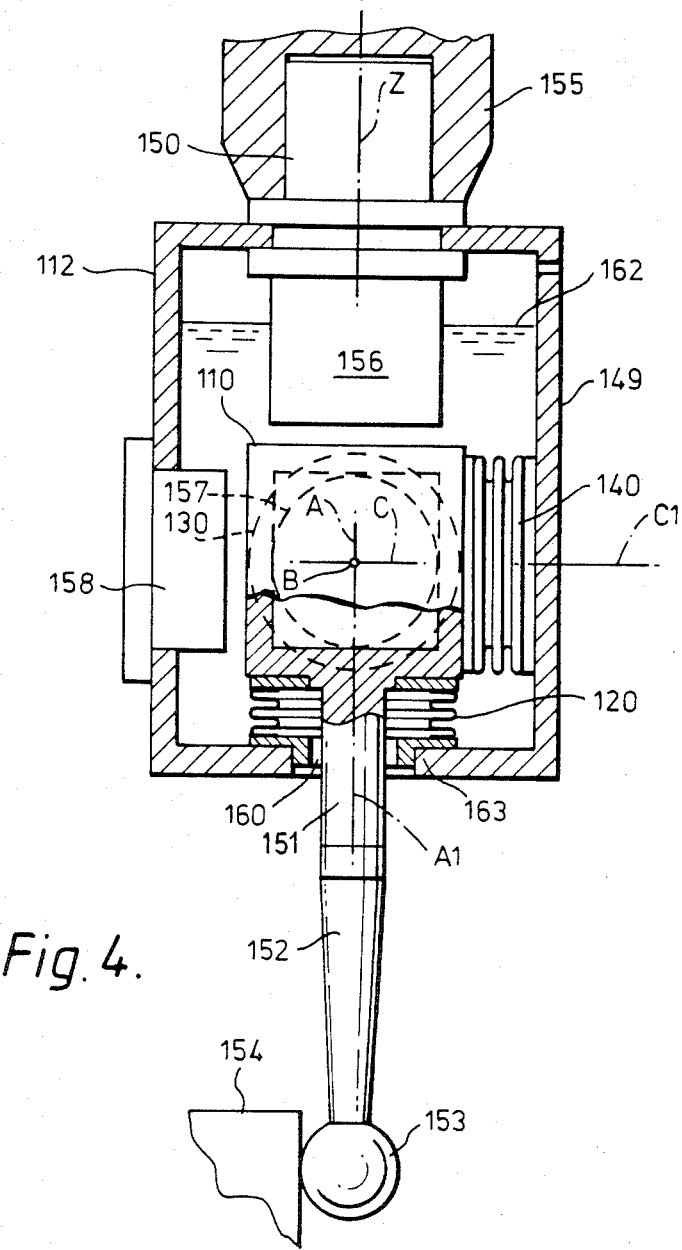
FIG. 4 is a sectional elevation of a probe according to a third example.

Referring to FIG. 4, there is shown a third probe embodiment comprising a cube-shaped moveable member 110 connected to a fixed member 112 by three support units or bellows 120, 130, 140 having mutually perpendicular axes A1, B1, C1. The three bellows are arranged respectively between three adjacent sides of the member 110 and the interior of a housing 149 which is part of the member 112. An end of each bellows is secured to the member 112 and the housing 149 e.g. by adhesive. Each bellows is made of a material, e.g. a suitable steel, which is resilient in bending but relatively rigid in shear so that the bellows is deflectable from its free position in any linear or angular sense except torsionally about its axis. Therefore the bellows cooperate to constrain the member 110 against rotation relative to the member 112 while allowing three-dimensional parallel motion of the member 110. The member 112 is provided with a spigot 150 for being secured to the head 155 of a coordinate measuring machine. The member 110 comprises a stylus socket 151 and a stylus 152 having a spherical end 153 for engagement with a workpiece 154 in the course of a measuring operation. Conveniently, the axes A1, B1, C1 intersect on an axis Z being the common axis of the spigot 150 and socket 151. However, the bellows can be arranged for the axes A1, B1, C1 to lie at equal angles to the axis Z substantially as shown with reference to the probe of FIGS. 1 and 2. The member 110 is biased into a given three-dimensional rest position relative to the member 112 by the bias of the three resilient bellows towards their free position. Displacement of the member 110 from its zero position, i.e. by engagement of the stylus with the workpiece, is sensed by three transducers being proximity sensors 156, 157, 158 secured to the member 112 at the sides thereof opposite the respective bellows. The resilience of the bellows causes the member 110 to return to its rest position when the displacing force ceases. The housing 149 may be filled with a liquid 162 supporting the member 110 in a state of buoyancy thereby reducing or removing any load applied by the member 110 to the bellows due to gravity.

The housing 149 has a portion 163 defining an opening 160. The bellows 120 is connected between the member 112 and the portion 163, and the stylus extends to the exterior of the housing 149 through the bellows 120 and the hole 160. Thus the bellows 120 serves to seal the housing 149 at the opening 160.

We claim:

1. Apparatus for sensing the position of an object comprising
   a fixed member;
   a moveable member including a stylus;
   three support units connected to said fixed and moveable members in position therebetween and aligned to respective directions any one of which is at an angle to the other two, said support units cooperating to constrain said moveable member for three dimensional parallel movement relative to the fixed member; and
   sensing means for sensing said movement;
   wherein the improvement resides in that said support units are each connected to said fixed and moveable members in positions therebetween to constitute parallel connections between the members; and each support unit comprises rigid means constraining the moveable member against rotation about the direction pertaining to the unit, and flexible means permitting said relative movement in said directions.

2. Position sensing apparatus according to claim 1, wherein each said unit comprises an arm secured at one end to the fixed member, and a pair of parallel links connected between the other end of the arm and the moveable member, the arm being rigid in torsion about a first axis lying in a first said direction, first pivot means permitting angular movement of the arm relative to the fixed member about a second axis having a second said direction, the links extending in the third said direction and being spaced apart in said second direction, second pivot means permitting universal angular movement of each said link relative to the moveable member and relative to the arm, said links and said arm cooperating to constrain the moveable member against rotation relative to the fixed member about said first axis while permitting three-dimensional parallel displacement of the moveable member relative to the fixed member.

3. Apparatus according to claim 1, wherein each said unit comprises a torsionally rigid but otherwise flexible bellows connected between the moveable and fixed members.

4. Apparatus according to claim 1, wherein said flexible means are relatively stiff to bias the stylus into a rest position.

5. Apparatus according to claim 1, wherein said fixed member comprises a housing, said moveable member is situated within the housing, and comprising a liquid contained within the housing and cooperating to support the moveable member by virtue of the buoyancy thereof.

6. Apparatus according to claim 1, wherein the fixed member comprises a housing, the moveable member is situated within the housing, and the stylus projects from within the housing through a portion thereof defining an opening therein.

7. Apparatus according to claim 1, wherein each said unit comprises a torsionally rigid but otherwise flexible bellows connected between the moveable and the fixed member, the fixed member comprises a housing, the moveable member is situated within the housing and the stylus projects from within the housing through a portion defining an opening therein, and one of said bellows is connected in a position between the moveable member and said portion and so as to surround the stylus insofar as the latter extends within the housing.

8. Apparatus according to claim 1, wherein said sensing means comprise in respect of each said direction an inductive sensor having an output proportional to a said displacement.

* * * * *